United States Patent [19]

Tabor

[11] Patent Number: 4,674,477
[45] Date of Patent: Jun. 23, 1987

[54] SOLAR COLLECTOR AND METHOD OF MAKING SAME

[75] Inventor: Harry Z. Tabor, Jerusalem, Israel

[73] Assignee: The Scientific Research Foundation, Jerusalem, Israel

[21] Appl. No.: 280,959

[22] Filed: Jul. 7, 1981

[30] Foreign Application Priority Data

Jul. 11, 1980 [IL]  Israel .................................. 60561

[51] Int. Cl.⁴ ................................................ F24J 3/02
[52] U.S. Cl. ..................................... 126/443; 126/450
[58] Field of Search ............... 126/426, 443, 446, 447, 126/448, 450; 174/82; 138/159, 162, 163, 170, 171

[56] References Cited

U.S. PATENT DOCUMENTS

| 4,069,811 | 1/1978 | Tabor | 126/446 |
| 4,129,119 | 12/1978 | Yoke | 126/438 |
| 4,186,724 | 2/1980 | Nelson | 126/443 |
| 4,231,353 | 11/1980 | Kanatani et al. | 126/443 |

FOREIGN PATENT DOCUMENTS

| 2518926 | 11/1976 | Fed. Rep. of Germany | 126/443 |
| 2318393 | 2/1977 | France | 126/443 |
| 1508199 | 4/1978 | United Kingdom | 126/443 |
| 2023803 | 1/1980 | United Kingdom | 126/443 |

Primary Examiner—Margaret A. Focarino
Attorney, Agent, or Firm—Benjamin J. Barish

[57] ABSTRACT

A solar collector includes a transparent envelope and an absorber panel extending therethrough, the transparent envelope being constituted of a transparent plastic tube of smaller diameter than the width of the absorber panel such that the absorber panel supports the transparent plastic tube in an oval shape. In the described method of making the solar collector, a transparent plastic sheet is first bent into a right circular cylinder with its longitudinal edges secured together; and then a rigid absorber panel, having a width greater than the diameter of the cylinder, is inserted into the cylinder to deform it into an oval shape.

3 Claims, 10 Drawing Figures

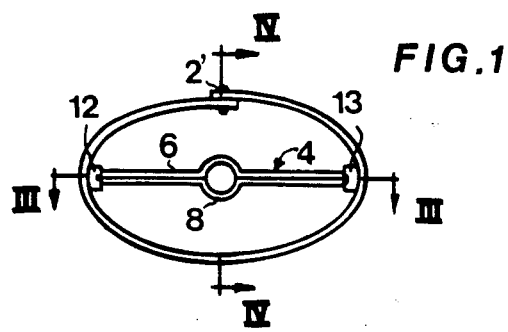
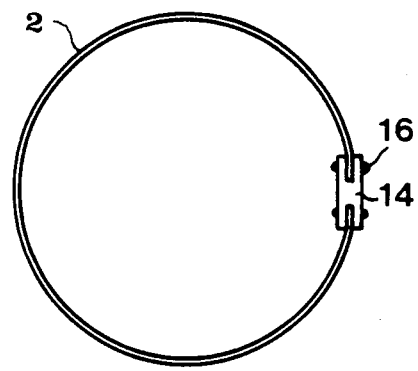
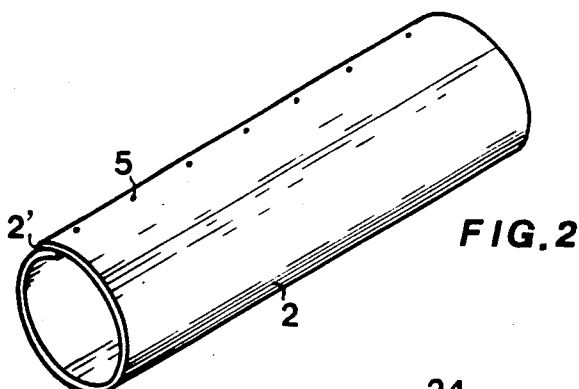
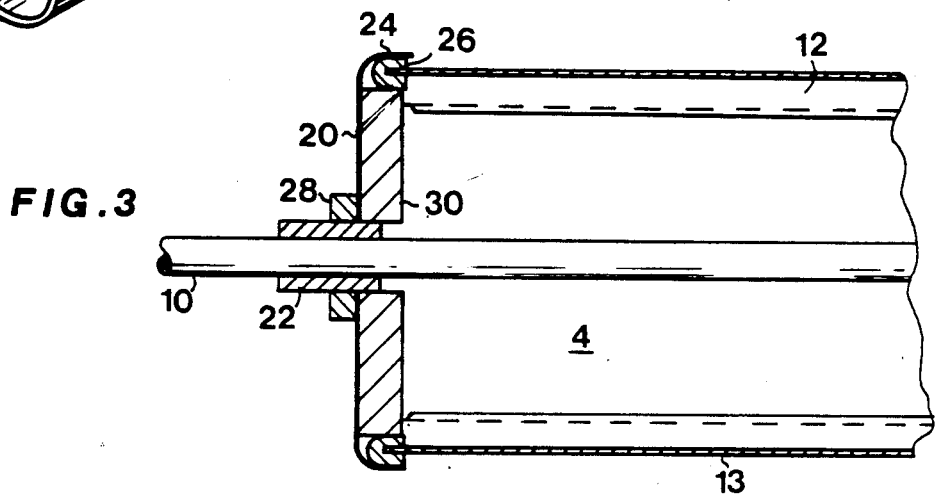
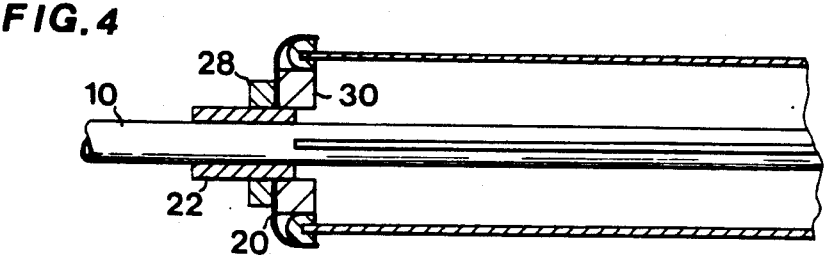

SOLAR COLLECTOR AND METHOD OF MAKING SAME

BACKGROUND OF THE INVENTION

The present invention relates to solar collectors, and to methods of making same. The invention is particularly applicable to the flat-plate type solar collector described in my Israel Pat. No. 47166, and corresponding U.S. Pat. No. 4,069,811, and is therefore described below with respect to this type of solar collector.

In the conventional solar collector, an absorber plate is housed in a flat box which is glazed with a transparent window (of glass or plastic) on the side facing the sun, the air-gap between the absorber plate and the window providing a measure of thermal insulation. The rear of the plate is covered with insulation material, such as rock wool, glass wool, foam insulation, or the like; and the rear of the box is closed off to protect the insulation material from rain, dust, and the like. The absorber panel includes a blackened heat-absorbing surface, and a liquid conduit for the liquid (e.g., water) heated by the solar energy absorbed by the blackened surface. The fluid conduit may be in the form of tubes clamped or bonded to the absorber panel, commonly called the "tube" construction. Another construction is called the DPI construction (Double Plate Integral), wherein the absorber panel is integrally formed with the fluid conduit, for example by forming two plates with one or more semi-conduits in each, and then securing the two plates together (e.g. by welding or bonding) thereby producing the integrally-formed fluid conduits.

The solar collector described in my U.S. Pat. No. 4,069,811 is a double-sided collector, wherein the rear of the box and the rear insulation are replaced by a second transparent window so as to allow the absorber panel to receive radiations from both sides. Thus, the front face to the absorber panel receives direct solar radiations, whereas the rear face receives radiations reflected from the ground, roof, or from an "albedo board", i.e. a white or light-colored surface that reflects insolation falling on it. In such a double-sided collector, the total insolation reaching each unit area of the absorber panel is larger than for a conventional collector. The heat losses are also larger, but convection heat flow in the downward direction is less than in the upward direction. These losses can be further reduced by using a selective black surface (i.e., one having a low thermal emittance) or having a transparent infra-red-reflecting surface on the inside of the window, as known in the art.

My U.S. Pat. No. 4,069,811 is directed to such a double-sided collector and discloses constructions for reducing air-circulation losses in such collectors, in one of which constructions the box is in the form of an oval-shaped transparent envelope with the absorber supported therein.

BRIEF SUMMARY OF THE INVENTION

The present invention is directed to an improved construction, and also to an improved method of making such a construction, of solar collector of the type including an oval-shaped transparent envelope.

According to one aspect of the present invention, there is provided a solar collector including a transparent envelope and an absorber panel extending therethrough, characterized in that the transparent envelope is constituted of a transparent plastic tube of deformable material initially of cylindrical shape and of smaller diameter than the width of the absorber panel such that the absorber panel when received within the transparent plastic tube, deforming it into an oval shape.

According to another aspect of the invention, there is provided a method of making the above-described solar collector, characterized in that a transparent plastic sheet is first bent into a right circular cylinder with its longitudinal edges secured together, and then a rigid absorber panel, having a width greater than the diameter of the cylinder, is inserted into the cylinder to deform same into an oval shape and to support same against collapse.

It will be seen that the present invention enables double-sided collectors to be constructed in a simple and inexpensive manner. Thus, the transparent plastic sheet forming the envelope may be cut to the appropriate dimensions, i.e. with its length approximately the length of the absorber panel and its width a little more than twice the width of the absorber panel. The transparent sheet may then be rolled up to form a cylinder which initially, due to the natural elasticity of the sheet will take the the form of a right circular cylinder; the two edges of the sheet may then be bound together, e.g. by methods more particularly described below. The absorber panel may be inserted into the cylinder so that the cylinder takes up an elliptical or oval shape supported along its widest diameter against collapse by the absorber panel. End plates may then be applied, as will also be described. more particularly below.

It will thus be seen that although the envelope is itself structurally weak, the main strength is provided by the absorber panel. Thus, in the above-described arrangement, the absorber panel supports the housing or envelope, as contrasted with conventional collectors wherein the housing or box supports the absorber panel.

Further features and advantages of the invention will be apparent from the description below.

BRIEF DESCRIPTION OF THE DRAWINGS

The invention is herein described, by way of example only, with reference to the accompanying drawings wherein:

FIG. 1 is a transverse sectional view illustrating one form of solar collector constructed in accordance with the invention;

FIG. 2 is a three-dimensional view illustrating one manner of initially forming the cylindrical transparent envelope, which is later deformed to produce the oval or elliptical shape illustrated in FIG. 1;

FIG. 2a illustrates another manner of forming the initially cylindrical transparent envelope;

FIG. 3 is a sectional view along lines III—III of FIG. 1;

FIG. 4 is a sectional view along lines IV—IV of FIG. 1;

DESCRIPTION OF PREFERRED EMBODIMENTS

Figure 6:
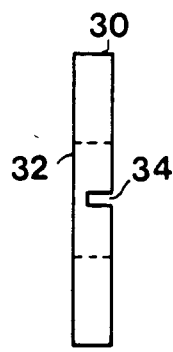
FIG. 6 is a side-elevational view of the oval-shaped end insulator of FIG, 5.

With reference first to FIG. 1, there is shown a solar collector constructed in accordance with the invention and including a transparent envelope 2 in the form of a sheet of transparent plastic material bent into an oval shape and having opposed longitudinal edges secured together at 2', the oval-bent sheet be supported from within against collapse from its oval shape by the absorber panel 4. Briefly, the transparent plastic sheet forming the envelope 2 is first bent into a right circular cylinder; its opposed longitudinal edges are then secured together as shown at 2'; and the rigid absorber panel 4, having a width greater than the diameter of the cylinder, is then inserted into the cylinder to deform it into the oval or elliptical shape as illustrated in FIG. 1 and to support it in this shape against collapse.

More particularly, the transparent sheet 2 forming the transparent envelope is cut to proper length and width, with its length (Ls) approximately equal to the length (La) of the absorber panel 4, and with the width of the sheet (Ws) slightly more than twice the width (Wa) of the absorber panel 4, but less than $\pi$Wa. As an example, for an absorber panel of width Wa of 30 cm, the plastic sheet may have a width Ws of about 75 cm. This sheet is then rolled up to form a cylinder which initially, due to its natural elasticity, will be a right circular cylinder of diameter Ws/$\pi$. The opposed edges of the sheet are then secured as by overlapping their ends, bonding their overlapping ends together with cement, and then applying fasteners 5, at intervals of, e.g. 10 cm, to increase the strength of the envelope.

The absorber panel 4 is preferably a blackened metal plate 6 formed with a fluid conduit 8 extending through its length for the fluid, e.g. water, to be heated by the absorbed solar radiation. The fluid conduit 8 includes tubular ends, as shown at 10 in FIGS. 3 and 4, projecting outwardly of the solar collector for attachment to the fluid line.

Preferably, insulating spacers 12, 13 are provided at the opposite longitudinal edges of the metal plate 6 of the absorber panel 4, for insulating the absorber panel from the transparent envelope 2. Thus, when the absorber panel 4 is inserted into the right circular cylinder of the bent transparent sheet 2, the right circular cylinder takes up an elliptical or oval shape having a major axis equal to Wa plus 2 g, wherein Wa is the width of the metal sheet 6, and "g" is the width of each insulating spacer 12 that insulates the absorber panel 4 from the inner face of the transparent envelope 6. The minor axis of the elliptical or oval shape, into which the transparent sheet 2 is bent by the absorber panel 4, adjusts itself according to the width Ws of the transparent sheet forming the envelope 2.

The width Ws of the transparent sheet is thus chosen to provide a reasonable air-gap on each side of the absorber panel 4, which in practice will usually be in the order of 3–6 cm, although this is not critical. This width should be chosen so that the air-gap on each side of the absorber panel 4 is as small as posible in order to provide a more compact unit and to reduce the amount of material required, but it should not be so small so as to cause cracking of the envelope at the regions of maximum curvature, i.e. at the ends of the major axis. Thus, for fiber-glass material of 0.6 mm thickness, it was found that an oval shape of 33 cm major axis, and of 12 cm minor axis, is a good and practical structure.

As indicated earlier, the transparent envelope 2 is itself structurally weak, the main strength being provided by the absorber panel 4, so that in effect the absorber panel supports the transparent envelope. This is to be contrasted with conventional collectors, wherein the envelope or box is structurally strong and supports the absorber panel.

FIG. 2a illustrates an alternative method of securing the ends of the transparent sheet 2 together to form the initial right-circular cylinder. In this alternative method, a metal or plastics H-section 14 is inserted between the edges of the transparent sheet 2, the latter edges being bonded to the H-section by adhesive and/or by fasteners 16.

If desired, a thin line of silicon or other sealant may be added to the joined ends of the transparent envelope made according to the method of either FIGS. 2 or 2a to render the joint water-tight.

After the absorber panel 4 has been inserted into the transparent sheet envelope 6, bent into the elliptical or oval shape as described above, end plates 20 are added to close off both ends. The end plates 20 are of oval shape to conform to the oval-bent shape of the transparent envelope 2. These end plates 20 are further formed with central openings through which the tubular ends 10 of the absorber panel 4 pass.

Preferably, insulating sleeves 22 are applied over the tubular end 10 of the absorber panel 4. These sleeves may be made of high temperature hose pipe to insulate the tubular ends 10 of the absorber panel 4 from the end plates 20, and also to act as a seal against the entry of water or dirt to the interior of the transparent envelope 2. These sleeves 22 project externally of the transparent envelope 2 sufficiently so that they can be used as bearings for pivotably receiving legs adapted to support the collector at any desired inclination, as will be more particularly described below with respect to FIGS. 7 and 8.

The two oval-shaped end plates 20 are preferably of elastic material and are formed with a bent-over lip 24 along their outer circumference for receiving a U-shape gasket 26 (e.g. of synthetic rubber) applied to the ends of the oval-bent transparent sheet 2. In addition, a clamping ring 28 is applied over the insulating sleeve 22 externally of each end plate 20 so as to apply a compressional force against the end plates tending to move the bent-over lips 24 formed at their outer circumference tightly against the gasket 26 carried by the ends of the transparent sheet 2. This arrangement, including clamping rings 28 and elastic end plates 20, not only provides a simple and inexpensive sealing of the ends of the transparent envelope 2, but also allows for the thermal expansion of the absorber panel 4.

In applications where a large expansion of the absorber panel along its length would occur, wherein the natural elasticity of the end plates 20 may not be sufficient, a helical or diaphragm spring (not shown) may be inserted between the clamping rings 28 and the end plates 20 to allow for lateral motion.

End insulation 30 may also be applied as the inner face of each end plate 20. This end insulation is more particularly illustrated in FIGS. 5 and 6, wherein it will be seen that it is also of oval shape, conforming to the shape of the respective end plate 20 but of smaller dimensions to accommodate the sealing gaskets 26. Each end insulation 30 is formed with a central opening 32 to allow the tubular end 10 of the absorber panel 4 to pass. In addition, a notch 34 is formed on the inner face of each of end insulators 30 along its major axis for dividing same into the two sections "a" and "b" (FIG. 5), and for receiving the corresponding end of the absorber panel 4.

Figure 5:
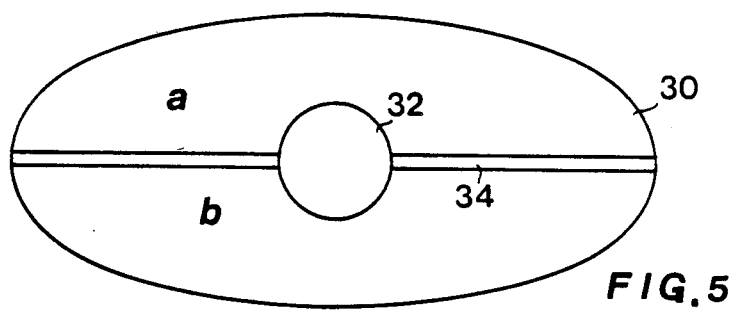
FIG. 5 is an enlarged end view of one of the oval-shaped insulators used at the ends of the collector illustrated in FIGS. 1, 3 and 4.

Each end insulation 30 may be formed as a single oval-shaped disc, as shown in FIGS. 5 and 6. Alternatively, the notches 34 may extend completely through the thickness of the disc, where-upon each end insulation would be constructed of two sections each formed with a semi-circular opening (together defining opening 32) for accommodating the tubular end 10 of the fluid conduit 8 in the absorber panel 4, the two sections being disposed on opposite sides of the respective end of the absorber panel.

Because the solar collector is preferably made long and narrow, the heat loss from the end is relatively small, and therefore the end insulation 30 is not essential and may be omitted particularly in low-temperature applications.

Figure 7:
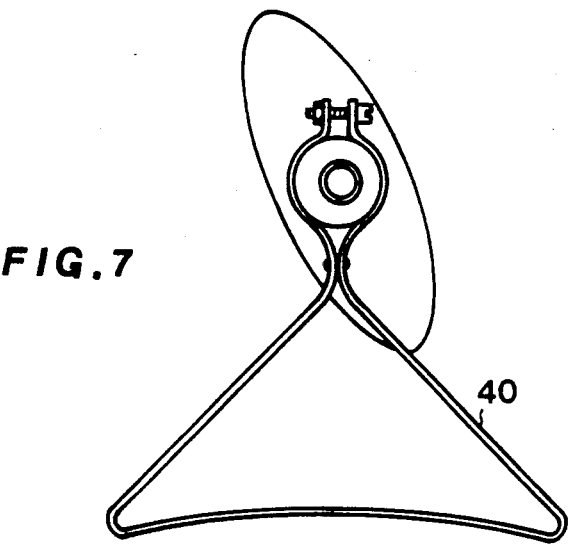
FIG. 7 is an end elevational view illustrating the pivotal mounting of the solar collector.
Figure 8:
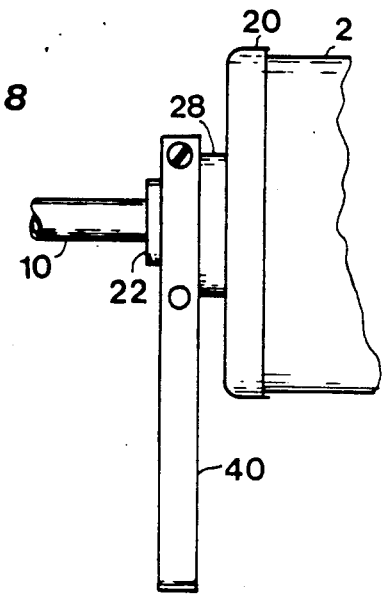
FIG. 8 is an enlarged side view of a portion of the mounting illustrated in FIG. 7.

FIGS. 7 and 8 illustrate the manner of using the insulating sleeves 22 for tiltably mounting the collector to a stand including legs 40 at its opposite sides. As shown in FIGS. 7 and 8, the legs 40 are adapted to be clamped onto the ends of sleeves 22 received over the tubular inlet and outlet ends 10 of the collector absorber panel. Thus, the sleeves 22 thermally insulate the collector from the legs 40, and in addition, they permit the collector to be tilted to any desired angle as the collector is supported by the legs 40.

Figure 9:
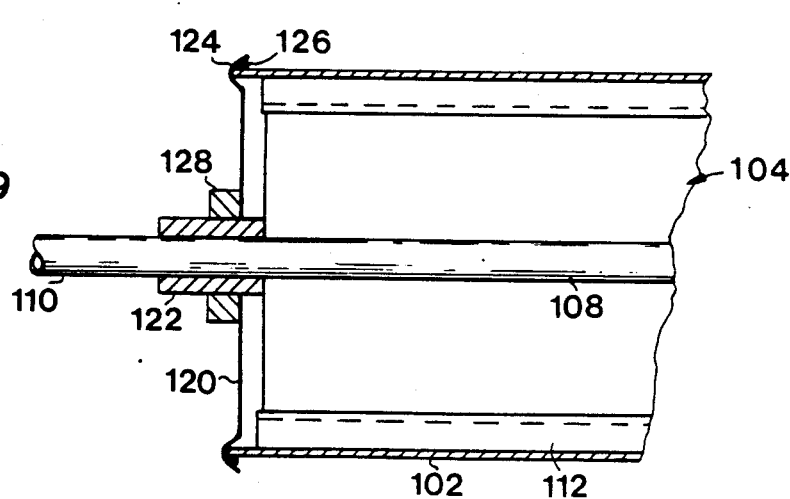
FIG. 9 is a partial fragmentary view corresponding to FIG. 3 but illustrating a modified construction.

FIG. 9 illustrates a modified construction, wherein each of the oval-shaped end plates, therein designated 120, has a V-groove 124 receiving the ends of the oval-bent transparent envelope 102. A sealing compound, such as a silicon glazing compound, is then applied into the outer portion of the V-groove, as shown at 126. In all other respects, the construction illustrated in FIG. 9 may be the same as described above, and includes the insulating spacers 112 along the opposite longitudinal edges of the absorber panel 104, the tubular ends 110 of the fluid conduit 108 extending lengthwise through the absorber panel, the insulating sleeves 122 applied at the opposite ends of fhe tubular end 110, and the clamping rings 128 for clamping the oval-shaped end plates 120 and for pressing their outer ends against the outer ends of the transparent envelope 102.

A long narrow collector, for which the present envelope construction is particularly appropriate, has additional advantages over the simplicity and low-cost advantages mentioned earlier. Thus, when using an absorber panel of the type illustrated, namely including a metal plate 6 and a tubular conduit 8 extending therethrough, only one tube 8, running the entire length of the absorber panel, is needed. This tube may therefore be provided along the central longitudinal axis of the absorber panel, whereupon the collector becomes symmetrical about the tubular ends 10 of the conduit, which serve as the inlet and outlet connections in the fluid line. These tubular ends 10 may not only act as the axis of rotation of the collector to change its tilt, as mentioned earlier in connection with FIGS. 7 and 8, but a number of collectors can be conveniently connected in series to form a long line, since the inlet of one collector is in line with the outlet of the next adjacent one.

In a "tube and fin" construction, a width of about 30 cm is feasible for the absorber panel; if the width is much greater, the fin efficiency becomes small, resulting in unnecessary loss of collector performance. If the absorber panel is made wider, more than one tube should be provided, in which case they could be connected with manifolds at each end, the inlet to and the outlet from each manifold being along the longitudinal central axis of the collector for the same reasons as discussed above for the single-tube type. If the absorber panel is of the "Double Plate Integral" (DPI) construction, the "manifolds" are in effect in the plates themselves, and again it would be desirable to have the inlet and outlet along the central axis.

In order to reduce the number of connections between collectors, the collectors should be made as long as possible. A length of two meters is practical; while longer lengths can readily be produced according to the procedures described above, transportation difficulties would be involved if the collector units are much longer than two meters.

The solar collector is preferably mounted above a white or light-colored roof or ground, so as to benefit by albedo, i.e. reflected insolation. The collector can also be used with mirrors, of glass, plastic or metal, to direct solar radiation onto the rear face of the absorber panel.

While the invention has been described with respect to a preferred embodiment, it will be appreciated that many other variations, modifications and applications of the invention may be made.

What is claimed is:

1. A method of making a solar collector including a transparent envelope and an absorber panel extending therethrough, characterized in that a deformable transparent plastic sheet is first bent into a right circular cylindar with its longitudinal edges secured together; and then a rigid absorber panel, having a width greater than the diameter of the cylinder, is inserted into the cylinder to deform same into an oval shape and to form said transparent envelope with said absorber panel extending therethrough.

2. The method according to claim 1, wherein insulating spacers are applied to the opposite longitudinal edges of the absorber panel before the same in inserted into the cylinder.

3. The method according to claim 1, further characterized in that the ends of the transparent plastic sheet, after being deformed by the absorber panel into said oval shape, closed by end plates having apertures through which pass tubular ends of a fluid conduit formed in the absorber panel, said tubular ends receiving locking rings engaging the outer faces of the end plates and pressing their inner faces against the ends of the oval-bent transparent sheet.

* * * * *